United States Patent [19]

Basseen et al.

[11] Patent Number: 4,761,968
[45] Date of Patent: Aug. 9, 1988

[54] HIGH EFFICIENCY AIR DRYING SYSTEM

[75] Inventors: Sanjiv K. Basseen, Anderson County; Richard A. Harlan, Morgan County, both of Tenn.

[73] Assignee: Pioneer Air Systems, Inc., Wartburg, Tenn.

[21] Appl. No.: 108,105

[22] Filed: Oct. 13, 1987

[51] Int. Cl.[4] .................................... F25D 23/00
[52] U.S. Cl. ........................... 62/271; 55/32; 55/387
[58] Field of Search .............. 62/271, 93, 94; 34/80; 55/29, 33, 35, 80, 83, 387, 32

[56] References Cited

U.S. PATENT DOCUMENTS

| | | | |
|---|---|---|---|
| 3,359,753 | 12/1967 | Fiedler et al. | 62/317 |
| 3,739,594 | 6/1973 | Freese | 62/93 |
| 4,062,129 | 12/1977 | Yoshida et al. | 34/80 |
| 4,171,624 | 10/1979 | Meckler et al. | 62/271 |
| 4,180,985 | 1/1980 | Northrup, Jr. | 62/94 |
| 4,193,443 | 3/1980 | Nanaumi et al. | 165/66 |
| 4,235,081 | 11/1980 | Dowling | 62/93 |
| 4,259,849 | 4/1981 | Griffiths | 62/271 |
| 4,638,852 | 1/1987 | Basseen et al. | 165/47 |

Primary Examiner—Henry A. Bennet
Attorney, Agent, or Firm—Pitts and Brittian

[57] ABSTRACT

A high efficiency system for removing moisture from compressed air and the like as used in pneumatic systems. To effectively achieve dew points of about −100 degrees F., the system utilizes two integrated dryer stages. The first stage causes the incoming air to be cooled to a dew point of about −35 to −40 degrees through the use of a refrigerant flowing in a heat exchanger to remove the heat of the air. Preferably for this cooling there is a precooler in the form of an air-to-air heat exchanger. The refrigerant is derived from a system having a compressor. The second stage of drying is achieved by passing the outlet air from the first stage, after removing moisture droplets and mist via a separator unit, into a heatless bed of desiccant or like material. Preferably, two beds are employed so as to permit one bed to be removing moisture while collected moisture is being removed (purged) from the other bed. This purging is achieved by using a small portion of the product air of the system that is heated by passing this air through a heat exchanger in the refrigerant system so as to use normally waste heat of the heated refrigerant to raise the temperature of the purge gas substantially to more effectively purge the moisture. This substantially reduces the amount of product air that is utilized for the purge; e.g., from about 15% to about 1-3%.

20 Claims, 2 Drawing Sheets

HIGH EFFICIENCY AIR DRYING SYSTEM

DESCRIPTION

TECHNICAL FIELD

The present invention relates generally to air drying systems for pneumatic systems, and more particularly to a high efficiency air drying system utilizing a refrigerated dryer and a heatless desiccant dryer in an integrated array so as to provide air having a pressure dew point of about −40 to about −100 degrees F. with substantially no loss of product air for regeneration of the desiccant dryer.

BACKGROUND ART

When air is compressed for use in pneumatic systems and the like, the temperature of the air is raised significantly in the compressor. For example, the outlet air temperature from the compressor may be as high as 350 degrees F. Air at this temperature tends to contain a significant amount of moisture. It is conventional practice to provide some form of moisture removal equipment in the exit stream from the compressor to remove the excess moisture prior to the use of the compressed air. This is particularly essential when the compressed air is used for machine tool air motors, for painting or for other similar applications where moisture would be detrimental.

Several forms of air dryers are known in the art. Probably the most commonly used equipment for the drying involves some piece of equipment which cools the air and then causes the moisture to condense on a surface such that it can be removed to provide air for the pneumatic systems having substantially reduced moisture content.

Numerous refrigerant-type dryers are known in the art. Typical of these dryers are described in U.S. Pat. No. 3,359,753, issued to M. Fiedler, et al, on Dec. 26, 1967; U.S. Pat. No. 4,193,443, issued to K. Nanaumi, et al, on Mar. 18, 1980; U.S. Pat. No. 4,235,081, issued to R. 0. Dowling on Nov. 27, 1980; and U.S. Pat. No. 4,638,852 issued to S. K. Basseen and R. A. Harlan, this patent having a common assignee with the present invention. The latter two patents have the dryer separated into an air-to-air exchanger and an air-to-refrigerant exchanger. The refrigerant-type dryers typically reduce the pressure dew point (PDP) of the pneumatic system air to about 35 to 40 degrees F.

Another general type of dryer is a desiccant dryer wherein moisture is adsorbed on a packing within the dryer. Periodically the collected water is removed (purged) from the packing to maintain the efficiency of the dryer. Usually two such dryer units (towers) are utilized so that as one is being used for drying, the other is being purged. The purging of these desiccant dryers is typically accomplished by one of two techniques. According to one technique, heaters are provided such that the packing can be heated to a temperature sufficient to drive off substantially all of the water to the atmosphere. The heaters can be either internal or external to the dryers. This is a costly construction, and can cause difficulty (e.g. fires) because of the required temperature. The second technique involves passing a portion of the product air through the packing such that this absorbs the moisture so that the disposal of the air to the atmosphere removes the moisture. This technique, when applied to the dryer, gives the dryer the term "heatless" in contrast to the former "heated" dryer. Although less costly to construct, the heatless dryers utilize approximately fifteen percent (15%) of the product air during a purge operation. This of course, requires a pump of greater capacity than when there is no purge loss. These desiccant dryers can provide exit air at a pressure dew point of about −40 degrees F.

Certain patents were located in a preliminary patent search relative to the present invention. These are: U.S. Pat. No. 3,739,594, issued to C. E. Freese on June 19, 1973; U.S. Pat. No. 4,062,129, issued to T. Yoshida, et al. on Dec. 13, 1977; U.S. Pat. No. 4,171,624, issued to G. Meckler, et al. on Oct. 23, 1979; U.S. Pat. No. 4,180,985, issued to L. L. Northrup, Jr. on Jan. 1, 1980; and U.S. Pat. No. 4,259,849, issued to W. C. Griffiths on April 7, 1981.

In addition to the above-identified shortcomings of the dryers of the known prior art, when the dryer used in a pneumatic air drying system fails, the pneumatic system is shut down.

Accordingly, it is a principal object of the present invention to provide a high efficiency drying system to dry air and other gases utilizing a heatless desiccant (or other sorbant) drying medium wherein loss of product air used for purging is substantially reduced.

It is another object of the present invention to provide a high efficiency drying system to dry air and other gases that achieves a pressure dew point of about −40 degrees F. to −100 degrees F. at a minimum cost.

It is also an object of the present invention to provide a high efficiency drying system to dry air and other gases that utilizes separable components such that air/gas can be processed by one component in the event of failure of the second component.

These and other objects of the present invention will become more apparent upon a consideration of a full description of the invention in conjunction with the accompanying drawings.

DISCLOSURE OF THE INVENTION

In accordance with the present invention, there is provided a high efficiency drying system for use in pneumatic systems and the like. Two integrated stages of drying are utilized to achieve a product air pressure dew point of at least −40 and up to about −100 degrees F. The first stage of drying is accomplished by passing incoming compressed air (or other gases) through a heat exchanger where the air/gas is cooled through the use of a circulating refrigerant. This is followed by drying using a heatless desiccant bed or the like. In the preferred form, the first stage includes an "air-to-air" exchanger to provide initial cooling prior to cooling with the refrigerant. In this exchanger the air/gas exiting the desiccant bed is used for this initial cooling of the incoming air/gas. A small portion of the product air/gas from the drying system, for example 1 to 3 percent, is circulated through a heat exchanger so as to recover some heat from the warm refrigerant. This heated air/gas then becomes the purge gas to be used to periodically purge accumulated moisture from the desiccant bed. In the preferred form of the invention there are two desiccant beds such that one can be used while the other is being purged. Furthermore, provision is made for optional separation of the two stages of drying such that either can be used individually if desired or necessary.

BEST MODE FOR CARRYING OUT THE INVENTION

Throughout this detailed description of the invention, the operation will be discussed with regard to the drying of air derived from a pneumatic system, the air being derived from an air compressor. The system is also applicable to other gas systems wherein the gas contains moisture that must be removed for any reason.

Figure 1:
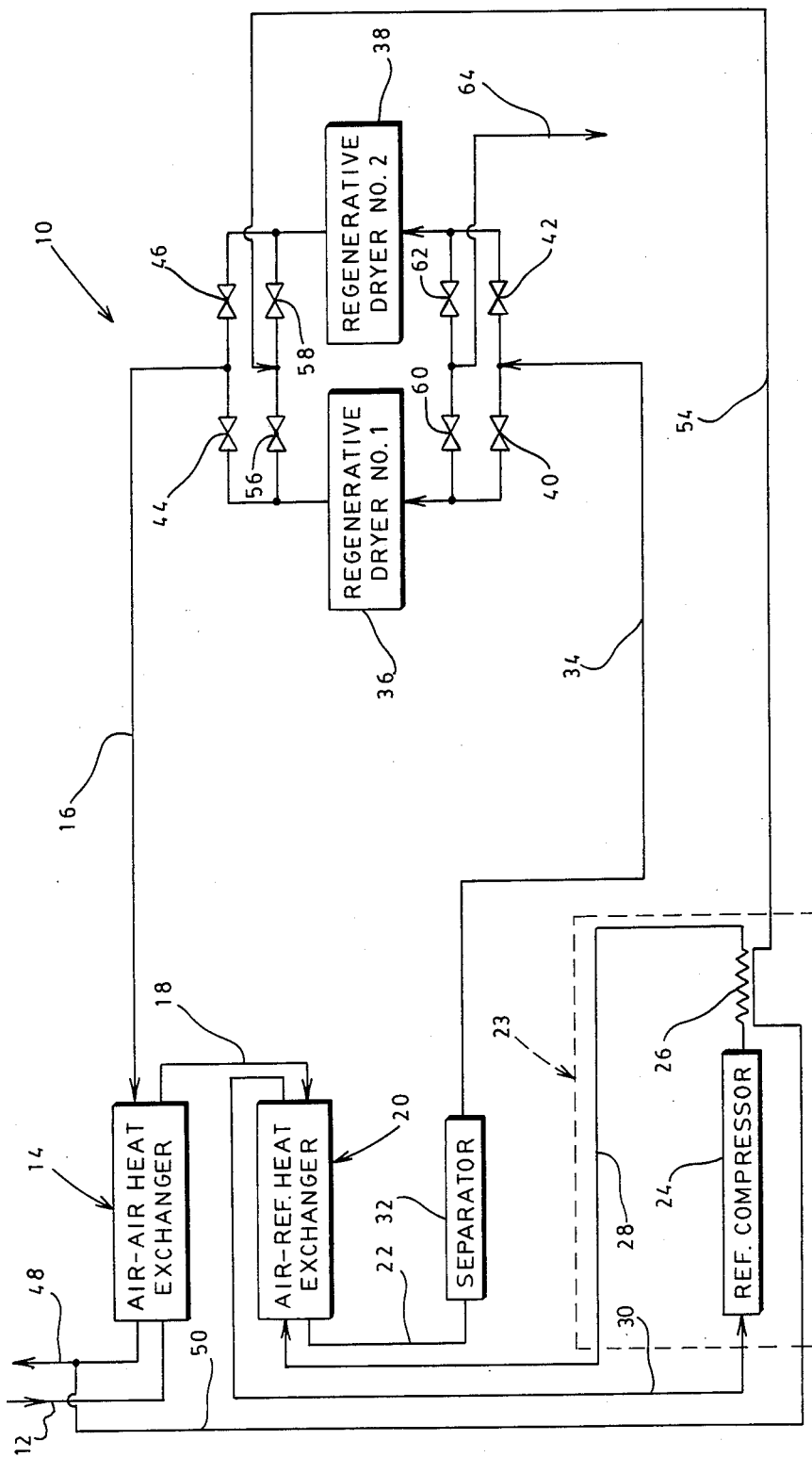
FIG. 1 is a schematic block diagram of a drying system for compressed air or other gases according to the present invention.

Referring now to FIG. 1, shown therein at 10 are the basic components that make up the present invention. Pressurized (and hot) air enters the system through line 12 for entry into an air-to-air heat exchanger means 14 where the hot air preferably flows counter currently to air, from line 16, that has already been dried by the system. The incoming air can be typically 100 degrees Fahrenheit or greater, with the exit air from the heat exchanger means 14 being typically 70 to 80 degrees. This precooled air then passes through line 18 to an air-to-refrigerant heat exchanger means 20. As in the other heat exchanger means, the flows are preferably counter current to effect the optimum cooling of the air. The air exiting through line 22 has been cooled to typically to a dew point of about 35 to 40 degrees F. It will be understood by persons versed in the art that, although superior operation can be achieved by the use of separate air-to-air and air-to-refrigerant heat exchanger means, there are applications for a dryer system in which only the air-to-refrigerant heat exchanger means can adequately cool the incoming air such that the moisture can be removed by the separator.

The refrigerant for this first stage of drying is derived from a refrigerant system 23 having a compressor 24 and a heat exchanger 26. The refrigerant from the heat exchanger 26 flows through line 28 to the heat exchanger means 20, and returns to the compressor 24 through line 30.

Moisture generally is present in the cooled air in line 22 in a form such that a major portion thereof can be removed in a separator 32 of conventional design. This initially dried air then passes through line 34 to the second stage of drying provided in the present invention.

The second stage of drying is accomplished using moisture sorption beds or towers 36, 38 preferably containing a suitable desiccant. As stated above, dual beds 36, 38 are preferred so as to use one for drying while the second is purged of the accumulated moisture. While desiccant beds are preferred, other sorption materials can be used upon (or in) which moisture can be trapped. The choice of the bed for moisture removal is made through selective operation of inlet valve means 40, 42 and outlet valve means 44, 46. Thus, for example, if valve means 40 and 44 are open and valve means 42 and 46 are closed, air will flow up through bed 36 and out through line 16. When the valve means are in a reverse position, the flow is through bed 38 to the line 16.

A unique aspect of the present invention is the manner of handling the removal of moisture from the beds 36, 38. When such removal (purging) is desired or necessary, a portion of dried air exiting the air-to-air exchanger 14 through line 48 is drawn off through line 50. This air is passed through the heat exchanger 26 of the refrigerant system so as to heat the purge air. Typically, this purge air has a temperature of about 120 degrees F. after passing through the heat exchanger 26 into line 54. The purge air is selectively delivered to one of the beds 36, 38 through selective operation of inlet valve means 56, 58 and outlet valve means 60, 62. Thus, if bed 36 is being used for drying, valve means 56, 60 are closed and valve means 58, 62 are open whereby bed 38 can be purged of moisture by the heated air, this air then passing out through exhaust line 64 to the atmosphere. Preferably the purge air flows through the beds in a direction opposite that for the drying of the air. The opposite set of valve means are utilized to purge bed 36 while bed 38 is being used to remove moisture from the air. Typically, the valve means can be operated by timers (not shown) to cycle the use of the beds because: (a) about 85% of the moisture removed is accomplished by the cooling step; and (b) the purge air is heated by the normally wasted refrigerant heat.

In heatless dryers of the prior art, a portion of the product air is used directly for purging: typically, about fifteen percent (15) of the product air is lost during this purge. In contrast, through the use of the heat derived from the refrigerant system according to the present invention, only one (1) to three (3) percent of the product air is required for adequate purging of the beds.

Figure 2:
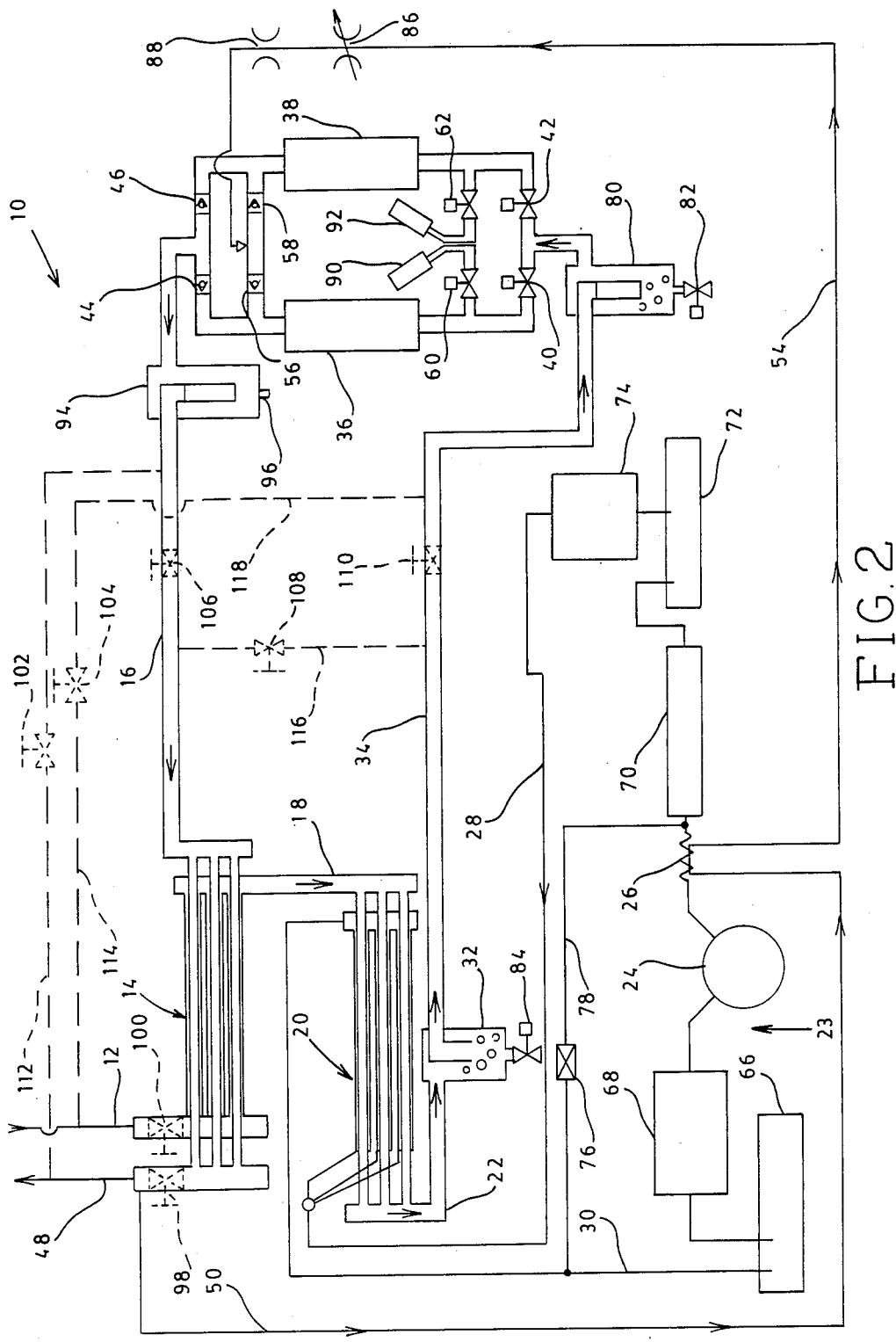
FIG. 2 is a more detailed schematic diagram of a preferred embodiment of the present high efficiency dryer system for compressed air or other gases.

A more detailed schematic diagram of the dryer of the present invention is illustrated in FIG. 2. Each component that is also identified in the FIG. 1 is referenced by the same number to assist in a review of the operation of the system. Inlet air is admitted to the system from line 12 into the heat exchanger means 14. Illustrated herein is a dual concentric tube exchanger of conventional design. Also, a triple tube exchanger of the type disclosed in our above-referenced U.S. Pat. No. 4,638,852 (incorporated herein by reference) can be used as well as other heat exchangers known to persons skilled in the art. This incoming air is passed counter currently to air flowing in line 16 so as to cool the incoming air and warm the air in line 16. This cooled air flows through line 18 to the air-to-refrigerant heat exchanger 20. Illustrated herein is a dual concentric tube exchanger of conventional design. Also, a triple tube exchanger of the type disclosed in U.S. Pat. No. 4,638,852 can be used as well as other exchangers of this type known to persons skilled in the art.

The refrigerant for this air-to-refrigerant exchanger 20 is supplied from the refrigerant system 23. This refrigerant system contains, in addition to the compressor 24 and heat exchanger 26, an accumulator 66 and a suction line filter 68 on the inlet line 30 to the compressor. Subsequent to the heat exchanger 26, the refrigerant system is provided with a condenser 70, a receiver 72 and a refrigerant dryer 74. Also provided is a hot gas bypass valve 76 in line 78. These are conventional components of a refrigerant system.

Shown in the FIG. 2 is an optional coalescer unit 80 positioned in the line 34 leading to the desiccant beds 36, 38. Air in pneumatic systems usually contains at least a small amount of oil that originates in the compressor. If this oil should coat the materials in the beds, their effectiveness would be lost. This deposition of oil necessitates a replacement of the material (desiccant). This coalescer unit is provided with a valved drain 82. Also shown is a valved drain 84 for the separator 32.

In the purge system, the line 54 to the beds 36, 38 is provided with a purge adjustment valve means 86 and a purge orifice 88 for the control of the amount of purge gas to be used for removing the moisture from the beds. This FIG. 2 shows that the preferred form of the air outlet valve means 44, 46 and the purge inlet valve means 56, 58 is a check valve such that only valve means 40, 42 and 60, 62 require manipulation, automatically as by a timer or manually by an operator. The purge air leaves the beds through the exhaust (64 of FIG. 1) in the form of individual mufflers 90, 92 to the atmosphere. The exit line 16 from the beds to the air-to-air exchanger 14 is shown to contain an optional particulate separator means 94 having a drain 96. This prevents any transfer of material from the beds 36, 38 into the exchanger tubes.

There may be situations where only one stage of drying is necessary or desired. For example, if the incoming air is exceptionally cool as from a line exterior to a building during cold weather, it may be desired to only utilize the beds 36, 38. Other conditions, such as the inoperability of one stage, might necessitate use of only one stage. In these events, the system illustrated in FIG. 2 contains a plurality of valve means as indicated with phantom lines at 98, 100, 102, 104, 106, 108 and 110. Through the selective operation of these valve means either of the stages of drying can be utilized independently of the other through lines indicated in phantom at 112, 114, 116 and 118. Normally, however, it is intended to operate the system as an integrated two-stage system with the cited benefits being derived from an integrated system.

A system of the type illustrated in FIG. 2 has been constructed and tested. It has been demonstrated that, for the effectiveness of the drying achieved by the system (to −100 degrees F.), the system is one of the most economical and practical systems that is know in the art. This development, because of this value to the art, has earned the developer the "Vaaler Award" Top Honors in 1986 from "Chemical Processing" as announced in their mid-November issue. As such, it was judged to be a major contribution toward more efficient and effective operation of plants in the chemical processing industries.

From the foregoing, it can be understood by persons skilled in the art that a dryer system has been provided for the efficient removal of moisture from compressed air (and other gases) prior to the use of that air in various types of pneumatic systems. Although only certain specific embodiments of the present invention have been shown and described, there is no intent to limit this invention by these embodiments. Rather, the invention is to be defined by the appended claims and their equivalents when taken in combination with the description.

We claim:

1. An improved drying system for removing moisture from air and like gases used in pneumatic systems to produce a product gas having a dew point of −40 to about −100 degrees Fehrenheit, which comprises:
    a heat exchange means having an inlet for receiving inlet gas from said pneumatic systems, and an outlet, for cooling said inlet gas to produce an outlet gas having a dew point of about 35 to 40 degrees F., said heat exchange means having a refrigerant flowing therein;
    a refrigerant system connected to said heat exchange means for supplying said refrigerant to said heat exchanger means, said refrigerant system having at least a compressor;
    a moisture separator means connected to said outlet of said heat exchanger means for removing condensed moisture contained in said cooled outlet gas;
    a moisture sorption means having at least one bed of moisture removal material, said sorption means having an inlet connected to said separator to receive gas having said condensed moisture removed, and an outlet for the removal of dried gas; and
    a purge system for selectively removing moisture from said bed of moisture removal material, said purge system including a withdrawl line to obtain a purge gas from said outlet of said moisture sorption means, a heat exchanger in said withdrawl line proximate said compressor said refrigerant system to heat said purge gas, and a means of selectively applying said purge gas from said heat exchanger to said bed for said selected removal of moisture from said bed.

2. The drying system of claim 1 for use with the drying of air wherein said heat exchanger means comprises:
    an air-to-air heat exchanger means to provide a precooling of said inlet gas, said air-to-air heat exchanger means having a first inlet to receive said inlet gas, a second inlet to received dried gas from said bed, a first outlet for withdrawing precooled gas, and a second outlet for delivering dried product gas to said pneumatic system;
    an air-to-refrigerant heat exchanger means to produce said gas having a dew point of about 35 to 40 degrees F., said air-to-refrigerant heat exchanger means having a first inlet to receive said precooled gas, a second inlet to receive said refrigerant from said refrigerant system, a first outlet for delivering gas to said separator means, and a second outlet for returning refrigerant to said refrigerant system; and
    wherein said withdrawl line to obtain said purge gas is connected to said second outlet of said air-to-air heat exchanger means.

3. The drying system of claim 1 wherein said moisture sorption means comprises:
    a pair of beds of said moisture removal material; and
    valve means connected to said beds for selectively alternating between said beds for removing said moisture and for purging said moisture from said moisture removal material with said purge gas.

4. The drying system of claim 3 wherein said moisture removal material in said beds is a desiccant.

5. The drying system of claim 2 wherein said air-to-air heat exchanger means comprises substantially concentric tubes and said inlets and outlets of said air-to-air heat exchanger means provide for counter current flow of said input gas and said gas from said moisture sorption means.

6. The drying system of claim 2 wherein said air-to-refrigerant heat exchanger means comprises substantially concentric tubes, and said inlets and outlets of said air-to-refrigerant heat exchanger means provide for counter current flow of said precooled air and said refrigerant.

7. The drying system of claim 2 further comprising an oil coalescense means interposed between said separator mean and said moisture sorption means for removal of oil from said air prior to introduction into said bed of moisture removal material.

8. The drying system of claim 2 further comprising a particulate removal means interposed between said moisture sorption means and said second inlet of said air-to-air heat exchanger means to prevent transfer of said moisture removal material to said air-to-air heat exchanger means.

9. The drying system of claim 1 further comprising valve means for selectively isolating said heat exchange system from said moisture sorption means whereby said heat exchange system and said moisture sorption means can be individually operated for the removal of moisture from said input gas of said pneumatic system.

10. An improved drying system for removing moisture from air used in pneumatic systems to produce product air having a dew point of about −40 to about −100 degrees Fahrenheit, which comprises:
   an air-to-air heat exchanger means to provide a precooling of inlet air to said drying system, said air-to-air heat exchanger means having a first inlet to receive said input air, a second input, a first output for withdrawing precooled air and a second outlet for delivery of said product air to said pneumatic system;
   an air-to-refrigerant heat exchanger means, said air-to-air refrigerant heat exchanger means having a first inlet connected to said first outlet of said air-to-air heat exchanger means to receive said precooled air, a second inlet to receive a refrigerant, a first outlet, and a second outlet for withdrawl of said refrigerant;
   a moisture separator means having an input connected to said first outlet of said air-to-refrigerant heat exchanger means, and an outlet;
   a refrigerant system having an inlet connected to said second outlet of said air-to-refrigerant heat exchanger means and an outlet connected to said second inlet of said air-to-refrigerant heat exchanger means, said refrigerant system having at least a compressor and a heat exchanger;
   a moisture sorption means having at least one bed of moisture sorption material, said sorption means having an inlet connected to said output of said moisture separator means, and an outlet connected to said second input of said air-to-air heat exchanger means; and
   a purge system for selectively removing moisture from said bed of moisture sorption material, said purge system including a withdrawl line connected to said second outlet of said air-to-air heat exchanger means to obtain a portion of said product air to serve as purge air, a portion of said heat exchanger of said refrigerant system being in said withdrawl line to heat said purge air with heated refrigerant, and means for selectively applying said heated air from said portion of said heat exchanger to said bed for said selective removal of moisture from said moisture sorption material.

11. The drying system of claim 10 wherein said moisture sorption means comprises:
   a pair of beds of said moisture sorption material; and
   valve means connected to said beds for selectively alternating between said beds for sorbing moisture and for purging moisture from said moisture sorption material.

12. The drying system of claim 11 wherein said moisture removal material in said beds is a desiccant.

13. The drying system of claim 10 wherein said air-to-air heat exchanger means comprises substantially concentric tubes and said inlets and outlets of said air-to-air heat exchanger means provide for counter current flow of said input air and said air from said moisture sorption means.

14. The drying system of claim 10 wherein said air-to-refrigerant heat exchanger means comprises substantially concentric tubes, and said inlets and outlets of said air-to-refrigerant heat exchanger means provide for counter current flow of said precooled air and said refrigerant.

15. The drying system of claim 10 further comprising an oil coalescense means interposed between said separator means and said moisture sorption means for removal of oil from said air prior to introduction into said bed of moisture removal material.

16. The drying system of claim 10 further comprising a particulate removal means interposed between said moisture sorption means and said second inlet of said air-to-air heat exchanger means to prevent transfer of said moisture removal material to said air-to-air heat exchanger means.

17. The drying system of claim 10 further comprising valve means for selectively separating said moisture sorption means from said air-to-air and air-to-refrigerant heat exchanger means whereby said air-to-air and air-to-refrigerant heat exchanger means can be operated together independently from said moisture sorption means.

18. An improved drying system for removing moisture from air used in pneumatic systems to produce product air having a dew point of about −40 to about −100 degrees Fahrenheit, which comprises:
   an air-to-air heat exchanger means to provide a precooling of inlet air to said drying system, said air-to-air heat exchanger means having a first inlet to receive said input air, a second input, a first output for withdrawing precooled air and a second outlet for delivery of said product air to said pneumatic system, said air-to-air heat exchanger means having concentric tubes and wherein said inlets and outlets of said air-to-air heat exchanger means provide for counter current flow;
   an air-to-refrigerant heat exchanger means, said air-to-refrigerant heat exchanger means having a first inlet connected to said first outlet of said air-to-air heat exchanger means to receive said precooled air, a second inlet to receive a refrigerant, a first outlet, and a second outlet for withdrawl of said refrigerant, said air-to-refrigerant heat exchanger means having concentric tubes and wherein said inlets and outlets of said air-to-refrigerant heat exchanger means provide for counter current flow of said precooled air and said refrigerant;
   a refrigerant system having an inlet connected to said second outlet of said air-to-refrigerant heat exchanger means and an outlet connected to said second inlet of said air-to-refrigerant heat exchanger means, said refrigerant system having at least a compressor and a heat exchanger;
   a moisture separator means having an input connected to said first outlet of said air-to-refrigerant heat exchanger means, and an outlet;
   a moisture sorption means having an inlet connected to said output of said moisture separator means and an outlet connected to said second input of said air-to-air heat exchanger means, said sorption means having first and second beds of desiccant material and valve means connected to said first and second beds for selectively choosing between said first and second beds for sorption of moisture; a purge system for selectively removing moisture from said first and second beds of desiccant, said purge system including a withdrawl line connected to said second outlet of said air-to-air heat exchanger means to obtain a portion of said product air to serve as purge air, a portion of said heat exchanger of said refrigerant system being in said withdrawl line to heat said purge air with heated refrigerant, and further valve means for selectively applying said heated purge air to said beds of desiccant for selective removal of moisture from said desiccant of one bed while moisture sorption occurs on an alternate bed.

19. The drying system of claim 18 further comprising:
an oil coalescense means interposed between said moisture separator means and said moisture sorption means for removal of oil from said air prior to introduction into said beds of desiccant; and
a particulate removal means interposed between said moisture sorption means and said second inlet of said air-to-air heat exchanger means to prevent transfer of said desiccant to said air-to-air heat exchanger means.

20. The drying system of claim 18 further comprising further valve means for selectively separating said moisture sorption means from said air-to-air and air-to-refrigerant heat exchanger means whereby said air-to-air and air-to-refrigerant heat exchanger means can be operated together but independently from said moisture sorption means.

* * * * *

REEXAMINATION CERTIFICATE (1558th)

United States Patent [19]

Basseen et al.

[11] B1 4,761,968
[45] Certificate Issued  Sep. 17, 1991

[54] HIGH EFFICIENCY-AIR DRIVING SYSTEM

[75] Inventors: Sanjiv K. Basseen, Anderson County; Richard A. Harlan, Morgan County, both of Tenn.

[73] Assignee: Pioneer Air Systems, Inc.

Reexamination Request:
No. 90/002,007, Apr. 25, 1990

Reexamination Certificate for:
Patent No.: 4,761,968
Issued: Aug. 9, 1988
Appl. No.: 108,105
Filed: Oct. 13, 1987

[51] Int. Cl.$^5$ .............................. F25D 23/00
[52] U.S. Cl. ............................ 62/271; 55/32; 55/387
[58] Field of Search ............. 62/271, 93, 94; 34/80; 55/39, 179, 180, 183, 185, 29, 33, 80, 83, 387

[56] References Cited

PUBLICATIONS

Deltech Bulletin 800 J "Deltech Heat Pump Dryers".
Deltech Owner's Manual for Heat Pump Air Dryer.
Deltech Schematic Drawing for Heat Pump Dryer.
Deltech Parts List for Heat Pump Dryer.

Primary Examiner—Henry Bennett

[57] ABSTRACT

A high efficiency system for removing moisture from compressed air and the like as used in pneumatic systems. To effectively achieve dew points of about −100 degrees F., the system utilizes two integrated dryer stages. The first stage causes the incoming air to be cooled to a dew point of about −35 to −40 degrees through the use of a refrigerant flowing in a heat exchanger to remove the heat of the air. Preferably for this cooling there is a precooler in the form of an air-to-air heat exchanger. The refrigerant is derived from a system having a compressor. The second stage of drying is achieved by passing the outlet air from the first stage, after removing moisture droplets and mist via a separator unit, into a heatless bed of desiccant or like material. Preferably, two beds are employed so as to permit one bed to be removing moisture while collected moisture is being removed (purged) from the other bed. This purging is achieved by using a small portion of the product air of the system that is heated by passing this air through a heat exchanger in the refrigerant system so as to use normally waste heat of the heated refrigerant to raise the temperature of the purge gas substantially to more effectively purge the moisture. This substantially reduces the amount of product air that is utilized for the purge; e.g., from about 15% to about 1-3%.

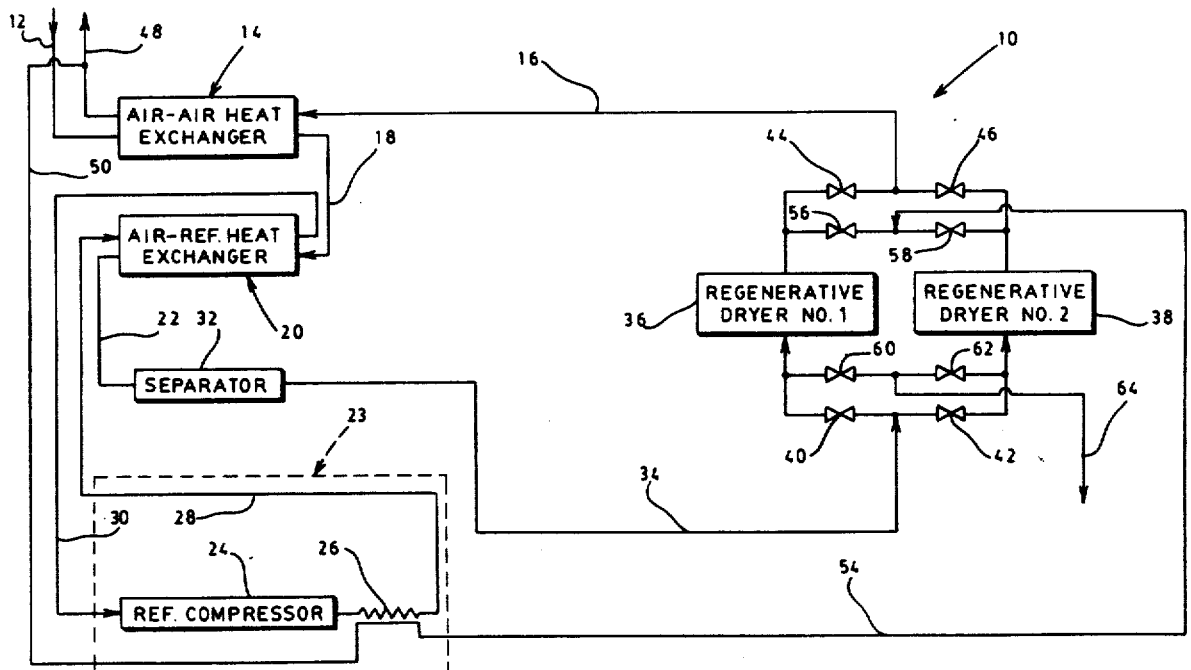

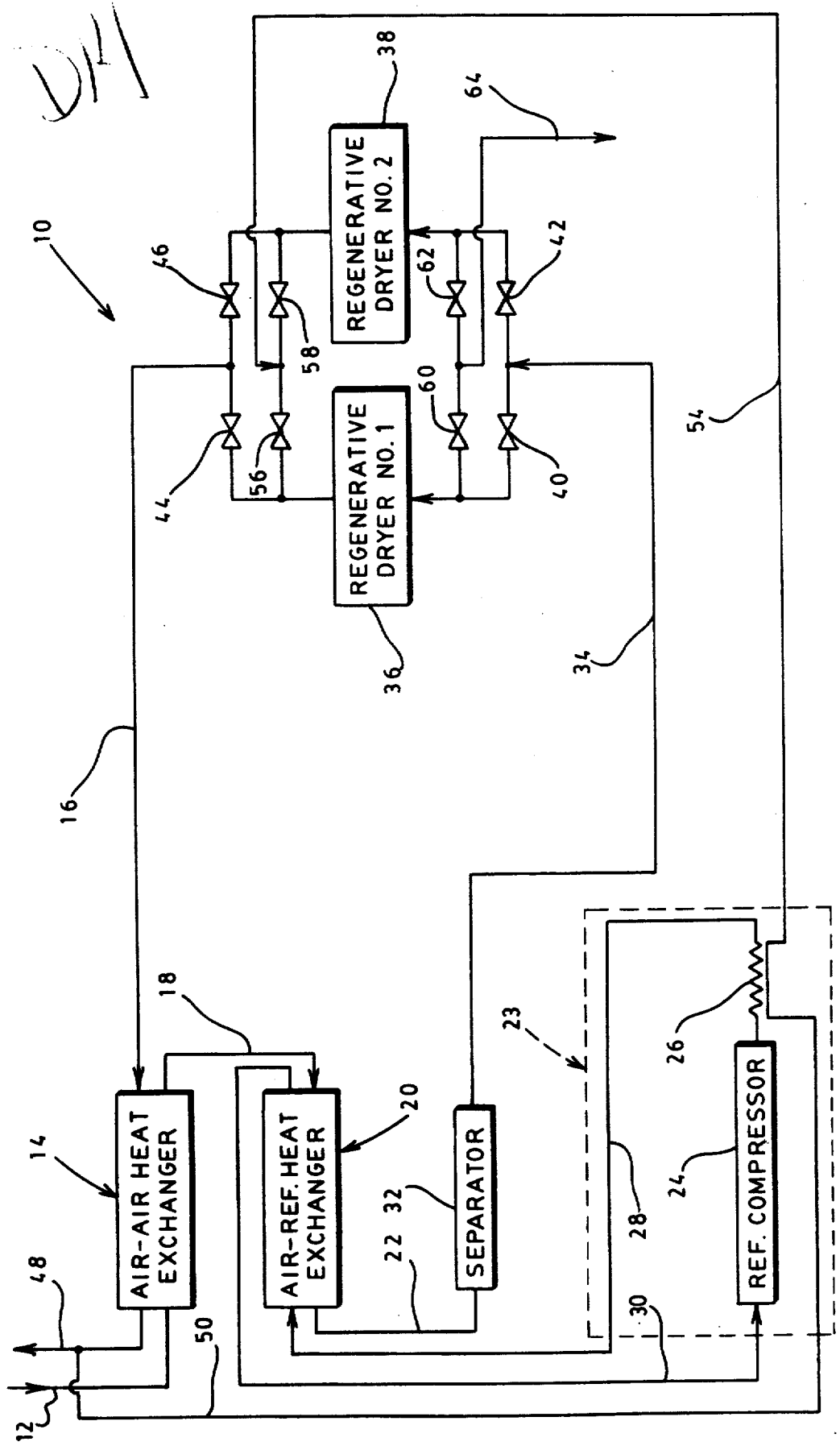

B1 4,761,968

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3–7, and 10–17 are cancelled.

Claims 2, 9 and 18 are determined to be patentable as amended.

Claims 8 and 19 dependent on an amended claim are determined to be patentable.

New claims 21 and 22 are added and determined to be patentable.

2. The drying system of claim [1] *22* for use with the drying of air wherein said heat exchanger means comprises:
   an air-to-air heat exchanger means to provide a precooling of said inlet gas, said air-to-air heat exchanger means having a first inlet inlet to said inlet gas, a second inlet to received dried gas from said bed, a first outlet for withdrawing precooled gas, and a second outlet for delivering dried product gas to said pneumatic system;
   an air-to-refrigerant heat exchanger means to produce said gas having a dew point of about 35 to 40 degrees, F., said air-to-refrigerant heat exchanger means having a first inlet to receive said precooled gas, a second inlet to receive said refrigerant from said refrigerant system, a first outlet for delivering gas to said separator means, and a second outlet for returning refrigerant to said refrigerant system; and
   wherein said withdrawl line to obtain said purge gas is connected to said second outlet of said air-to-air heat exchanger means.

9. The drying system of claim [1] *21* further comprising valve means for selectively isolating said heat exchange [system] *means* from said moisture sorption means whereby said heat exchange [system] *means* and said moisture sorption means can be [individually] *independently* operated for the removal of moisture from said input gas of said pneumatic system.

18. An improved drying system for removing moisture from air used in pneumatic systems to produce product air having a *pressure* dew point of about −40 to about −100 degrees fahrenheit, which comprises:
   an air-to-air heat exchanger means to provide a precooling of inlet air to said drying system, said air-to-air heat exchanger means having a first inlet to receive said [input] *inlet*, and a first [output] *outlet* for withdrawing precooled air and a second outlet for delivery of said product air to said pneumatic system, said air-to-air heat exchanger means provide for counter current flow;
   an air-to-refrigerant heat exchanger means, said air-to-refrigerant heat exchanger means having a first inlet connected to said first outlet of said air-to-air heat exchanger means to receive said precooled air, a second inlet to receive a refrigerant, a first outlet, and a second outlet for [withdrawl] *withdrawal* of said refrigerant, said air-to-refrigerant heat exchanger means having concentric tubes and wherein said inlets and outlets of said air-to-refrigerant heat exchange means provide for counter current flow of said precooled air and said refrigerant;
   a refrigerant system having an inlet connected to said second outlet of said air-to-refrigerant heat exchanger means and an outlet connected to said second inlet of said air-to-refrigerant heat exchanger means, said refrigerant system having at least a compressor and a heat exchanger;
   a moisture separator means having an [input] *inlet* connected to said first outlet of said air-to-refrigerant heat exchanger means, and an outlet;
   a moisture sorption means having an inlet connected to said [output] *outlet* of said moisture separator means and an outlet connected to said second [input] *inlet* of said air-to-air heat exchanger means, said sorption means having first and second beds of desiccant material and valve means connected to said first and second beds for selectively choosing between said first and second beds for sorption of moisture;
   a [purger] *purge* system for selectively removing moisture from said first and second beds of desiccant, said purge system including a [withdrawl] *withdrawal* line connected to said second outlet of said air-to-air heat exchanger means to obtain a portion of said product air to serve as purge air, a portion of said heat exchanger of said refrigerant system being in said [withdrawal] *withdrawal* line to heat said purge air with heated refrigerant, and further valve means for selectively applying said heated purge air to said beds of desiccant for selective removal of moisture from said desiccant of one bed while moisture sorption occurs on an alternate bed; *and*
   *valve mean for selectively separating said moisture sorption means from said air-to-air and air-to-refrigerant heat exchanger means whereby said air-to-air and air-to-refrigerant heat exchanger means can be operated together but independently of said moisture sorption means.*

*21. An improved drying system for removing moisture from air and like gases used in pneumatic systems to produce a product gas having a pressure dew point of −40 to about −100 degrees Fahrenheit, which comprises:*
   *a heat exchange means having an inlet for receiving inlet gas from said pneumatic system, and an outlet, for cooling said inlet gas to produce an outlet gas having a pressure dew point of about 35 to 40 degrees F., said heat exchange means having a refrigerant flowing therein;*
   *a refrigerant system connected to said heat exchange means for supplying said refrigerant to said heat exchanger means, said refrigerant system having at least a compressor;*
   *a moisture separator means connected to said outlet of said heat exchanger means for removing condensed moisture contained in said cooled outlet gas;*
   *a moisture sorption means having at least one bed of moisture removal material, said sorption means hav-* ing an inlet connected to said moisture separator to receive gas having said condensed moisture removed, and an outlet for the removal of dried gas;

a purge system for selectively removing moisture from said bed of moisture removal material, said purge system including a withdrawal line to obtain a purge gas downstream from said outlet of said moisture sorption means, a heat exchanger in said withdrawal line proximate said compressor of said refrigerant system to heat said purge gas, and a means of selectively applying said purge gas from said heat exchanger to said bed for said selected removal of moisture from said bed; and particulate removal means interposed between said outlet of said moisture sorption means and said heat exchanger in said withdrawal line to prevent transfer of said moisture removal material to said heat exchanger.

22. An improved drying system for removing moisture from air and like gases used in a pneumatic system to produce a produce gas having a pressure dew point of $-40$ to about $-100$ degrees Fahrenheit, which comprises:

a heat exchange means having an inlet for receiving inlet gas from said pneumatic system, and an outlet, for cooling said inlet gas to produce an outlet gas having a pressure dew point of about 35 to 40 degrees F., said heat exchange means having a refrigerant flowing therein:

a refrigerant system connected to said heat exchange means for supplying said refrigerant to said heat exchanger means, said refrigerant system having at least a compressor;

a moisture separator means connected to said outlet of said heat exchanger means for removing condensed moisture contained in said cooled outlet gas;

a moisture sorption means having at least one bed of moisture removal material, said moisture sorption means having an inlet connected to said moisture separator to receive gas having said condensed moisture removed, and an outlet for the removal of dried gas;

a purge system for selectively removing moisture from said bed of moisture removal material, said purge system including a withdrawal line to obtain a purge gas downstream from said outlet of said moisture sorption means, a heat exchanger in said withdrawal line proximate said compressor of said refrigerant system to heat said purge gas, and a means of selectively applying said purge gas from said heat exchanger to said bed for said selected removal of moisture from said bed; and valve means for selectively interconnecting said heat exchange system to said moisture sorption means whereby said heat exchange means and said moisture sorption means can be independently, and in combination, operated for removal of moisture from said inlet gas of said pneumatic system to thereby secure maximum drying efficiency for said pneumatic system.

* * * * *